United States Patent [19]
Kuo

[11] Patent Number: 5,943,898
[45] Date of Patent: Aug. 31, 1999

[54] METHOD AND APPARATUS TO COLDWORK HOLES

[76] Inventor: Albert S. Kuo, 14244 Kinderhook Dr., Chesterfield, Mo. 63017

[21] Appl. No.: 09/024,670

[22] Filed: Feb. 17, 1998

[51] Int. Cl.$^6$ .................................................... B21D 31/00
[52] U.S. Cl. ...................................... 72/370.07; 72/391.2
[58] Field of Search .............................. 72/370.07, 391.2, 72/FOR 101

[56] References Cited

U.S. PATENT DOCUMENTS

| | | |
|---|---|---|
| 3,566,662 | 3/1971 | Champoux . |
| 3,895,922 | 7/1975 | Phillips . |
| 3,943,748 | 3/1976 | King, Jr. . |
| 3,951,561 | 4/1976 | Speakman . |
| 4,164,807 | 8/1979 | King, Jr. . |
| 4,423,619 | 1/1984 | Champoux . |
| 4,433,567 | 2/1984 | Mead ................................. 72/370.07 |
| 4,665,732 | 5/1987 | Hogenhout . |
| 5,127,254 | 7/1992 | Copple . |

OTHER PUBLICATIONS

C. M. Wayman, Shape Memory Alloys, Materials Research Society Bulletin, vol. 18, No. 4, Apr. 1993.

*Primary Examiner*—Lowell A. Larson

[57] ABSTRACT

A method and apparatus for coldworking holes using a pre-lubricated tubular seamless sleeve made of shape memory alloys. The apparatus uses a pre-lubricated tubular seamless sleeve made of shape memory alloys, a mandrel having a larger diameter end, a nose cap with rough conical surface, and a spacer with rough complementary conical surface. The sleeve is placed and sufficiently firmly held between the conical surfaces of the nose cap and spacer which are carried in a mandrel pulling means. The larger diameter end of the mandrel passes forwardly through and out of the sleeve whose diameter is therefore elastically expanded by the passing mandrel and thereafter restores to its original diameter because of the superelastic property of the shape memory alloys. The smaller diameter portion of the mandrel is surrounded and within the sleeve. The sleeve together with the mandrel are then inserted into a hole in an associated workpiece. The nose cap being carried on the mandrel pulling means is placed against the workpiece. The mandrel retracts backwardly through and out of the sleeve; thereby expands the sleeve wall against the hole wall and exerts radially outward forces on the sleeve, which in turn transmits the coldworking forces to the hole wall. After the mandrel is pulled out of the hole, the sleeve diameter restores to its original diameter because of the superelastic property of shape memory alloys, and therefore it can be easily removed out of the hole.

20 Claims, 4 Drawing Sheets

Forward ←

Forward ←

METHOD AND APPARATUS TO COLDWORK HOLES

BACKGROUND OF THE INVENTION

The stress concentration at the edge of holes shortens fatigue lives of structures and machinery. To avoid premature fatigue failures, the design stress can be decreased to an appropriate low value. However, such a decreased design stress value will result in an increase in weights of the structures and machinery. Metal fatigue is a peculiar design concern in the aircraft industry because of the stringent light weight design requirement and the abundance of holes in the airframe structures. The fatigue life of holes can be enhanced by hole coldworking which creates a beneficial compressive residual stress at hole edge. Several prior art methods are available to enhance fatigue lives of holes, for example, split sleeve method described in U.S. Pat. No. 3,566,662, seamless sleeve method described in U.S. Pat. No. 4,164,807, stress coining method described in U.S. Pat. No. 3,895,922, and split mandrel method described in U.S. Pat. No. 4,665,732. The split sleeve method is the common method currently used in the aircraft industry. The disadvantages of the prior art of split sleeve and split mandrel methods are:

i) The split in the sleeve or the split in the mandrel creates a ridge and shear discontinuity in the wall of coldworked hole. The ridge and shear discontinuity reduce the effectiveness of coldworking to enhance fatigue life.

ii) A final reaming step is often required to clean up the ridge and shear discontinuity, and to size the coldworked holes. The final reaming step requires extra labor and prolongs process time; therefore, it incurs significant manufacturing cost.

iii) The final reaming step removes material from a coldworked hole, thereby reduces the beneficial compressive residual stress at the hole edge, and thereby reduces the effectiveness of coldworking.

The prior art of split mandrel method does not use a sleeve to protect the hole in a workpiece; this would save time and cost. However, it has the propensity to create galling on the hole wall because there is no medium between the hole and split mandrel to protect the hole wall. It also suffers the aforementioned disadvantages because of the split in the mandrel.

The prior art of seamless sleeve method does not create ridge and shear discontinuity in the hole wall and does not require a final reaming step; it should result in better fatigue life improvement than the prior art of split sleeve and split mandrel methods. However, the disadvantage of this prior art method is that the plastically deformed seamless sleeve become stuck with the hole wall and is under the compressive stress exerted by the hole wall. Thus, it is difficult to remove the sleeve out of the hole after coldworking. To leave the seamless sleeve in the coldworked hole for isolating the fretting phenomenon has not been a desired practice because the sleeves made of steels increase the weight of airframe structures. Another disadvantage of this prior art method is that it requires the mandrel to be taken off the mandrel pulling means for assembling the seamless sleeve onto the small diameter portion of the mandrel. The prior art of various stress coining methods, for example, radius coining, pad coining, and ring pad coining, have limited application because of the relative complexity of the methods; they are primarily used for non-circular holes and very large circular openings where the prior art of split sleeve and split mandrel methods are not applicable. All of the aforementioned disadvantages of the prior art of coldworking methods can be eliminated by the present invention which utilizes a tubular seamless sleeve made of shape memory alloys.

SUMMARY OF THE INVENTION

The present invention described herein is an improvement of the prior art of split-sleeve, split mandrel, and seamless sleeve coldworking methods. The improvement is to eliminate the aforementioned disadvantages of the prior art methods and to increase the intensity of the fatigue life enhancement.

A tubular seamless sleeve coldworking method and apparatus utilizing shape memory alloys (abbreviated hereinafter as SMA in this document) has been invented and described hereinafter to enhance the fatigue life of holes. The shape memory alloys tubular seamless sleeve coldworking method will eliminate the final reaming step of the prior art of split sleeve and split mandrel coldworking methods described in U.S. Pat. Nos. 3,566,662 and 4,665,732. In contrast to the prior art of seamless sleeve coldworking method described in U.S. Pat. No. 4,164,807, the diameter of the SMA seamless sleeve will restore owing to the superelastic property of SMA, after hole expansion, to a size small than the diameter of the coldworked hole to ease the removal of the seamless sleeve. Hence the present invention not only reduces manufacturing time and cost but also creates higher beneficial compressive residual stress at hole edge than the split sleeve and split mandrel method.

In general, the method of coldworking holes of this invention comprises the steps of assembling a prelubricated tubular seamless sleeve made of SMA and the associated parts to the coldworking mandrel pulling means, securing firmly the sleeve in the mandrel pulling means, passing the mandrel forwardly through the sleeve, inserting the mandrel and sleeve into a hole to be coldworked in an associated workpiece, holding the sleeve in the hole while retracting the mandrel backwardly from the workpiece, thereby expanding the sleeve to contact with hole wall and thereby compressing the materials of the sleeve and hole in a radial direction taken from the center axis of the hole, and removing the sleeve whose diameter restores to its original size prior to coldworking out of the coldworked hole. The apparatus uses a pre-lubricated tubular seamless sleeve made of SMA, a mandrel having a larger diameter end, a nose cap with rough conical surface, and a spacer with rough complementary conical surface.

It is therefore an object of the present invention to provide a hole coldworking method which eliminates the need for the final reaming of holes, thereby reduces manufacturing time and cost, and thereby better improves fatigue life of holes than the prior art methods of coldworking.

It is a further object of the present invention to provide a hole coldworking method and apparatus using tubular seamless sleeve made of shape memory alloys, which reduces the necessary steps and eliminates the disadvantages of the prior art methods of coldworking, and further provides high fatigue life improvement of holes.

Another object of the present invention is to provide a novel method and apparatus using tubular seamless sleeve made of SMA for coldworking holes wherein the fatigue life versus the coldworking interference is significantly improved.

The present invention has the following advantages when compared with the prior art of split sleeve, split mandrel, and seamless sleeve coldworking methods:

i). Eliminates the aforementioned disadvantages of the split sleeve, split mandrel, and seamless sleeve methods.

ii). Reduces the time to perform coldworking because there is no need to do final reaming of the hole after coldworking, and thereby reduces manufacturing cost.

iii). Preserves higher beneficial compressive residual stress at hole edge because the invention eliminates the final reaming step which relieves portion of the compressive stress. This will result in better fatigue life enhancement.

iv) Achieves higher compressive residual stress at hole edge with lower interference level of coldworking. This advantage will make it easier to coldwork those holes in the short transverse direction of the high strength aluminum thick plates wherein ductility is low and is susceptible to stress corrosion.

DESCRIPTION OF THE FIGURES

Further objects and advantages of the present invention will become apparent from the following description taken in conjunction with the accompanying drawings, which are illustrated in cross sectional and isometric views for explanatory purpose.

DETAILED DESCRIPTION OF THE INVENTION

When considering the most essential steps of this invention to improve the prior art of coldworking methods, references should be made to FIGS. 1 through 7.

The present invention of coldworking utilizes a seamless sleeve made of shape memory alloys (abbreviated as SMA hereinafter in this document) which has the superelastic property. The superelastic property of SMA is described in C. M. Wayman's article entitled "Shape Memory Alloys" which was published in Materials Research Society Bulletin, Volume 18, Number 4 Apr. 1993. To demonstrate how can the SMA be used to overcome the difficulty of removing the seamless sleeve out of a coldworked hole in the prior art of seamless sleeve method, the underlying concept of present invention is explained with the following example to coldwork a 0.1875 inch diameter hole using a SMA tubular seamless sleeve. All dimensions below are in the unit of inch.

| | |
|---|---|
| Pre-coldwork hole diameter: | 0.1875 |
| Selected interference level of coldworking: | 4.0% |
| Expanded hole diameter with sleeve and mandrel in the hole: | 0.1875 × 1.04 = 0.1950 |
| Selected wall thickness of sleeve: | 0.006 |
| Mandrel diameter: | 0.1950 − (2 × 0.006) = 0.1830 |
| Selected sleeve outside diameter which must be smaller than pre-coldwork hole diameter: | 0.184 (<0.1875) |
| Sleeve inside diameter: | 0.1840 − (2 × 0.006) = 0.1720 |

While the seamless sleeve and mandrel are in the hole during coldworking, the sleeve inside diameter, 0.1720, is expanded by the mandrel to the same size as the mandrel diameter, 0.1830. The hoop strain of the sleeve is calculated below:

$$\frac{0.1830 - 0.1720}{0.1720} = \frac{0.0110}{0.1720} = 6.4\%$$

This 6.4% of hoop strain is substantially larger than the yield strain of most materials except the SMA. To ease the removal of the seamless sleeve out of a hole, the strain of 6.4% must be smaller than the critical recoverable strain of a SMA so that the sleeve outside diameter can restore, via the superelasticity property of a SMA, to a size which is smaller than the plastically expanded hole diameter after coldworking. The critical recoverable strain is a characteristic and is specific to each SMA. For the Nitinol family of SMA, this critical strain is approximately 7% to 10%. Except the SMA, the recoverable elastic strains of most metallic materials are smaller than 1.0% which is well below the current practice of coldworking interference level of about 4%. This is the reason why the sleeve in the prior art of seamless sleeve is difficult to be removed out of the expanded holes after coldworking. Present invention utilizes the SMA tubular seamless sleeve to overcome this difficulty.

One embodiment of the present invention is described hereinafter to illustrate the essential characteristics of the invention.

Figure 1:
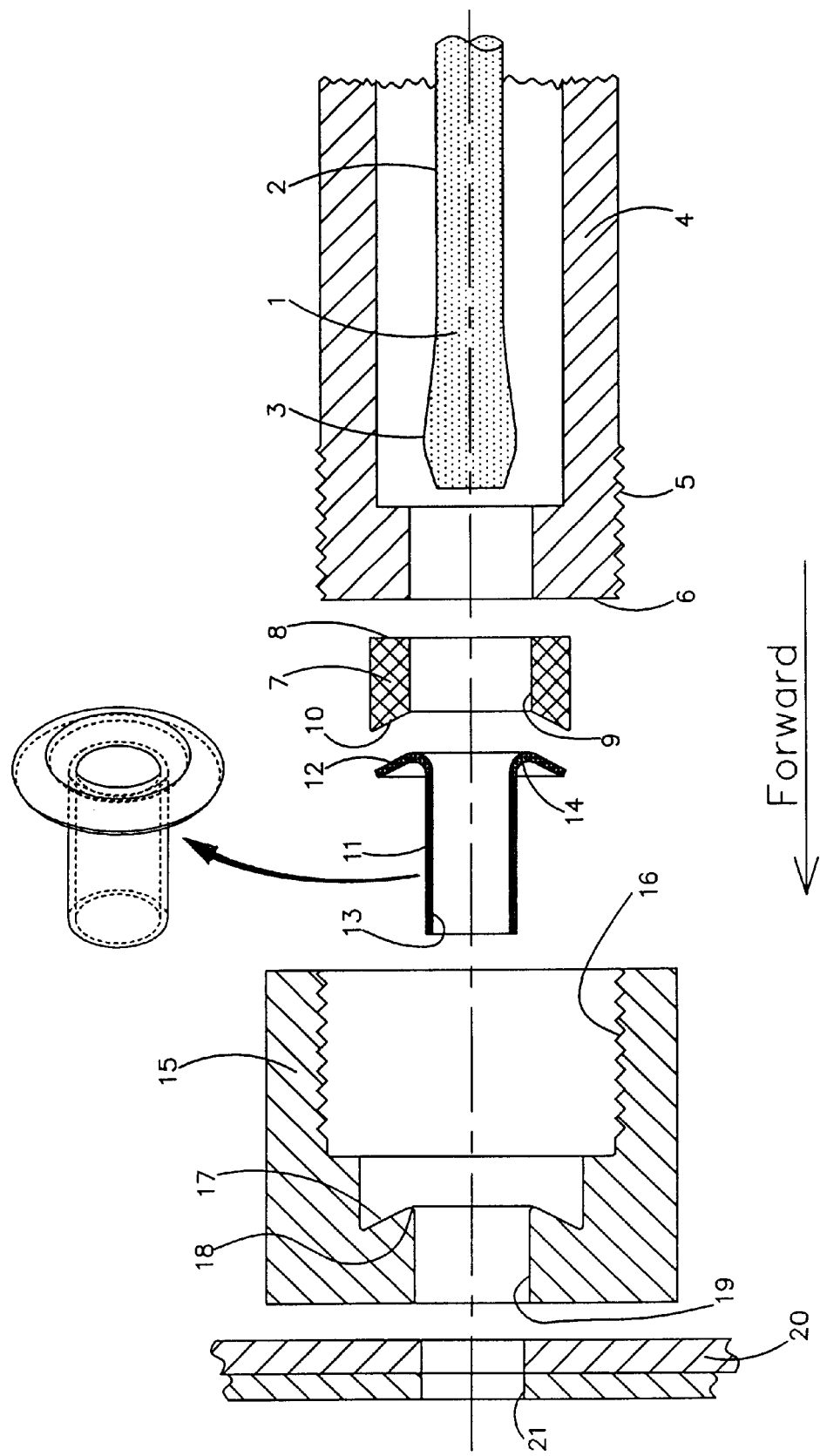
FIG. 1 is a cross sectional view of the parts of the invention, the forward end of the cylinder of a mandrel pulling means in which the invention is carried, and the workpiece. Also shown in FIG. 1 is an isometric view of the shape memory alloys seamless sleeve.

In FIG. 1, a portion of the cylinder of a mandrel pulling means 4 having a mandrel 1 is coaxially lined up with a workpiece 20 having a hole 21. Placed between the workpiece 20 and the cylinder of a mandrel pulling means 4 are a spacer 7, a prelubricated tubular SMA seamless sleeve 11, and a nose cap 15. The forward end of the cylinder of a mandrel pulling means 4 has a screw-threaded outside surface 5 and a flat smooth end surface 6. The mandrel 1 has a larger diameter portion 3 and a smaller diameter portion 2. The spacer 7 is made of hard material, has a flat smooth surface 8 in the backward end, has an conical rough surface in the forward end 10, and has a central circular passageway 9. The tubular SMA seamless sleeve 11 is made of shape memory alloys having the superelastic property, does not have a seam or slot in the sleeve wall, and comprises a conical shoulder portion 12, a tubular portion 13, and a fillet radius 14 joining the conical shoulder portion 12 and tubular portion 13. The required recoverable elastic strain for a SMA is determined by the desired coldworking interference level as explained hereinbefore. Any kind of SMA which has a critical recoverable elastic strain in excess of the required value can be used to make the seamless sleeve of the present invention. Currently, the Nitinol family of SMA is a preferred material because they have sufficient critical recoverable strain and are technologically well developed. When technology advances in the future, new family of SMA may be available for making the seamless sleeve of this invention. The nose cap 15 is made of hard material, has inside screw threads 16 in the backward end, a conical rough surface 17 for said seamless sleeve to rest on, a central circular passageway 19, and a fillet radius 18 joining said central circular passageway 19 and conical rough surface 17.

Figure 2:
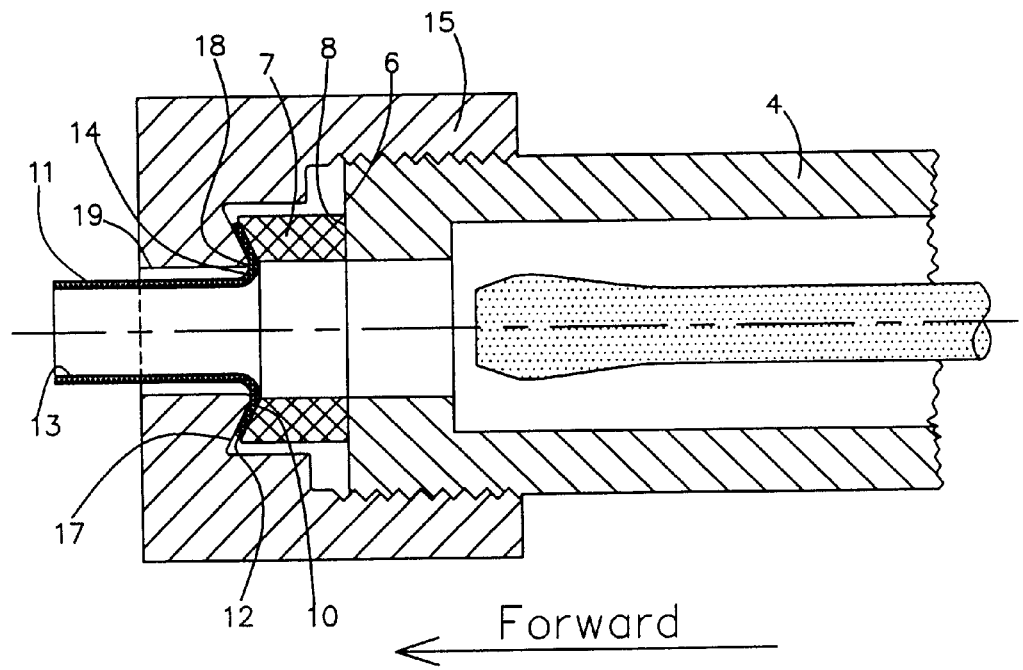
FIG. 2 is a cross sectional view of the parts of the invention, which are assembled together with a mandrel pulling means.

The first step of coldworking operation, illustrated in FIG. 2, is to assemble coaxially the cylinder of a mandrel pulling means 4, spacer 7, prelubricated tubular SMA seamless sleeve 11, and nose cap 15. The conical contact surfaces in said spacer 10 and nose cap 17, and the conical shoulder 12 of said seamless sleeve are complementary to each other to ensure the coaxiality of the affected parts being automatically maintained during assembling. The fillet radii in said seamless sleeve 14 and nose cap 18 are complementary to each other to maintain substantially equal space between the central circular passageway of said nose cap 19 and the tubular portion of said seamless sleeve 13.

The second step of coldworking operation, also illustrated in FIG. 2, is to secure firmly the conical shoulder of the SMA seamless sleeve 12 between the spacer 7 and nose cap 15 with force by tightening the screw-threaded nose cap onto the screw-threaded cylinder of a mandrel pulling means. The step of tightening is facilitated by the smooth surfaces of the backward end 8 of the spacer 7 and the forward end 6 of the cylinder of the mandrel pulling means 4. The conical rough contact surfaces of said spacer 10 and nose cap 17 increase the friction, thereby enhancing the firm position of said seamless sleeve 11.

Figure 3:
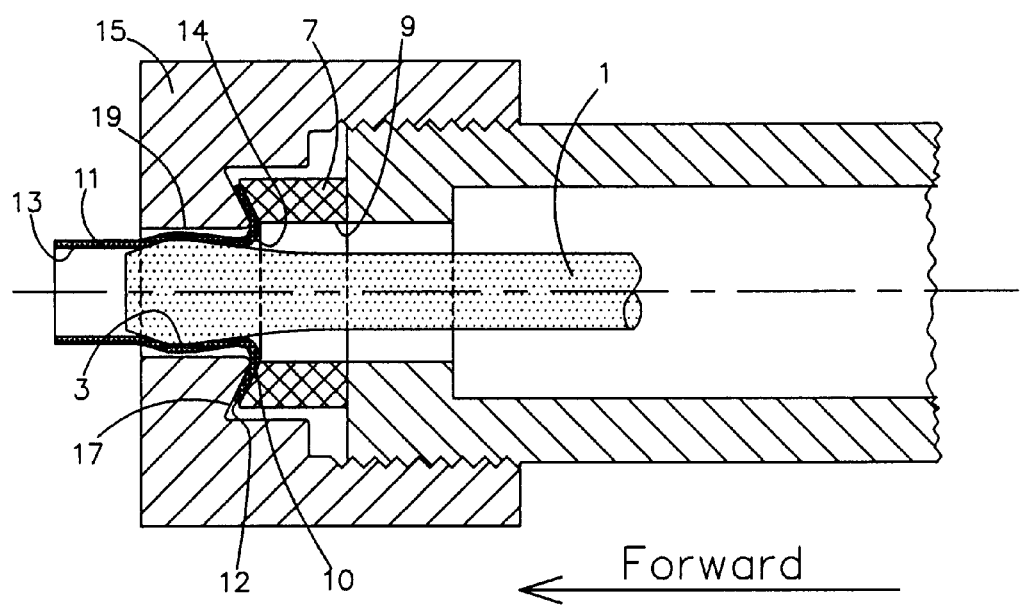
FIG. 3 is a cross sectional view which shows the expansion of the SMA tubular seamless sleeve while the mandrel passing forwardly through said seamless sleeve.
Figure 4:
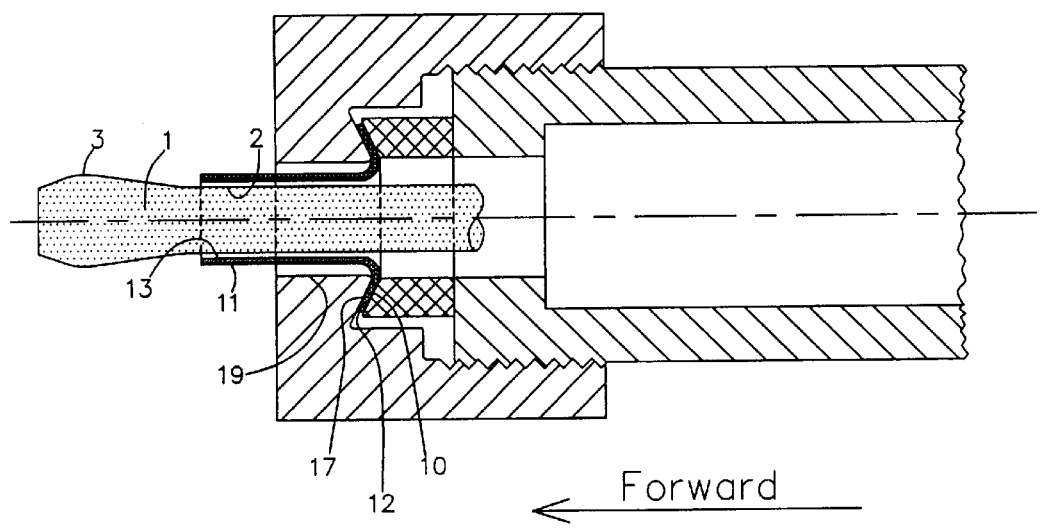
FIG. 4 is a cross sectional view to show that the SMA tubular seamless sleeve restores to its original diameter after the larger diameter portion of a mandrel passing forwardly through and out of said seamless sleeve.

The third step of coldworking operation is to pass, illustrated in FIG. 3, the larger diameter portion 3 of the mandrel 1 through the central circular passageway 9 of the spacer 7 and the tubular portion 13 of the SMA seamless sleeve 11, and to position, illustrated in FIG. 4, said mandrel 1 at a location such that the smaller diameter portion 2 of said mandrel 1 is adequately inside of said SMA seamless sleeve 11. Referring to FIG. 3, the fillet radius 14 joining the tubular portion 13 and shoulder portion 12 of said seamless sleeve 11 provides a larger diameter than the inside diameter of said tubular portion 13 of said seamless sleeve 11 to ease the entrance of the larger diameter portion 3 of said mandrel 1. Because the larger mandrel diameter 3 is substantially larger than the inside diameter of said SMA seamless sleeve 13, a substantial axial force is applied to said SMA seamless sleeve while the larger diameter portion 3 of said mandrel 1 passing through said SMA seamless sleeve. The lubricant provided on the inside surface of the tubular portion 13 of said SMA seamless sleeve decreases the friction between said mandrel and sleeve, thereby reduces the required axial force. However, to prevent the slippage of said SMA seamless sleeve, the conical shoulder 12 of said SMA seamless sleeve 11 is held firmly between the conical contact surfaces of said spacer 10 and nose cap 17. This is achieved by using the rough contact surfaces of said spacer 10 and nose cap 17 to increase friction, and by making the conical contact surfaces inclined in a direction in favor of preventing slippage while the larger diameter portion 3 of said mandrel 1 passing forwardly through said SMA seamless sleeve 11. The diameter of the central circular passageway 19 of said nose cap is sufficiently large so that the outside surface of said SMA seamless sleeve 11 will not interfere with said nose cap 15 while said mandrel 1 passing forwardly through said SMA seamless sleeve 11. While the larger diameter portion 3 of said mandrel passes through said SMA seamless sleeve 11, it exerts a radial force on and thereby elastically expands the diameters of said SMA seamless sleeve 11. Referring to FIG. 4, after the larger diameter portion 3 of said mandrel 1 passes forwardly through and out of said SMA seamless sleeve 11, the diameter of said SMA seamless sleeve restores to its original size owing to the superelastic property of the shape memory alloys. This third step of operation eliminates the need to take a mandrel off the mandrel pulling means for assembling seamless sleeve onto the smaller diameter portion 2 of said mandrel 1 as required by the prior art of seamless sleeve method.

Figure 5:
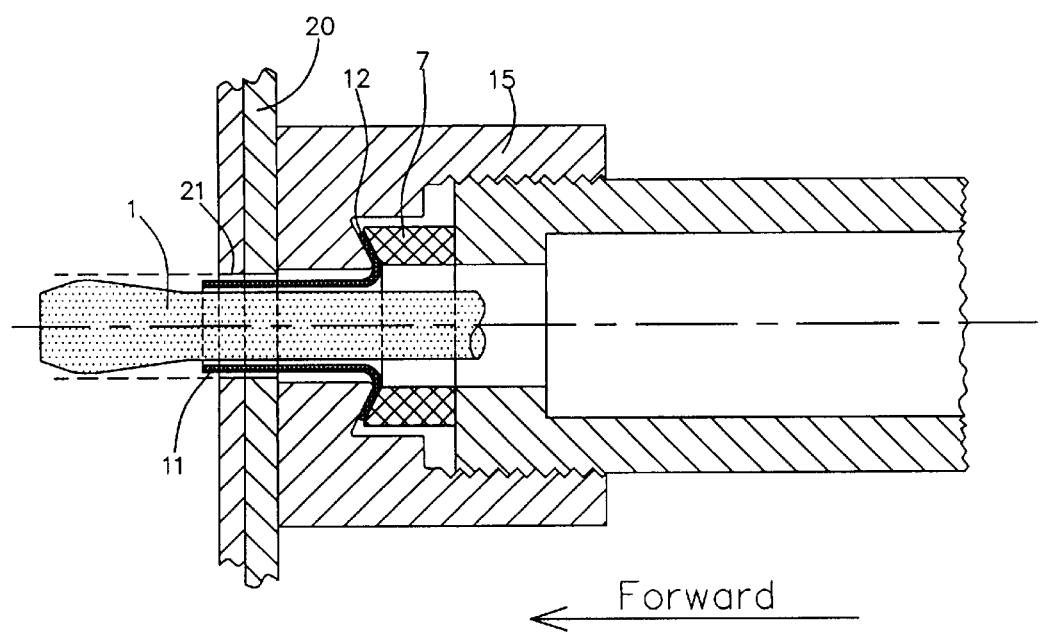
FIG. 5 is a cross sectional view which shows the insertion of the SMA tubular seamless sleeve and a mandrel into the hole of the associated workpiece, and the relative diameters of said hole, seamless sleeve, and mandrel.

The fourth step of coldworking operation, illustrated in FIG. 5, is to insert the mandrel 1 and the SMA seamless sleeve 11 into the hole 21 of an associated workpiece 20. The position of the hole 21 in said workpiece 20 is coincident with the smaller diameter portion 2 of said mandrel 1 surrounded by said SMA seamless sleeve 11 whose conical shoulder 12 remains firmly held between the spacer 7 and nose cap 15.

Figure 6:
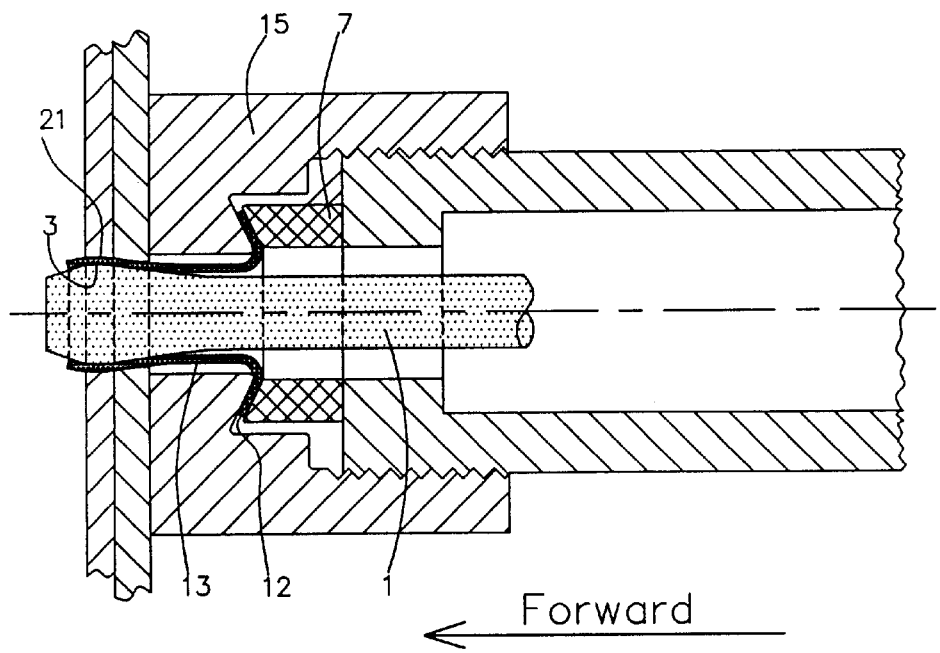
FIG. 6 is a cross sectional view which shows the expansion of the SMA tubular seamless sleeve and the hole of the associated workpiece while the mandrel retracting backwardly through said seamless sleeve.

The fifth step of coldworking operation, illustrated in FIG. 6, is to retract the mandrel 1 backwardly, therefore the larger diameter portion 3 of said mandrel 1 exerts a radial force onto the tubular portion 13 of the SMA seamless sleeve because the diameter of the larger diameter portion 3 of said mandrel 1 is substantially larger than the diameter of the tubular portion 13 of said seamless sleeve. The deforming of the tubular portion 13 of said sleeve is shown exaggerated in FIG. 6 for explanatory purpose. The movement of the tubular portion 13 of said sleeve in the axial or circulatory direction is insignificant because the shoulder portion 12 of said sleeve is held firmly between the spacer 7 and nose cap 15, and because the lubricant on the inside surface of the tubular portion of said sleeve decreases the friction between said mandrel 3 and sleeve 13, and because of the high friction of the contact surfaces between the hole 21 and tubular portion 13 of said sleeve. The diameter of the tubular portion 13 of said sleeve elastically expands beyond the diameter of the hole 21 in the associated workpiece 20, therefore the material of the hole 21 is compressed by the tubular portion 13 of said sleeve and the hole diameter expands beyond its yield strength. Thus, a compressive residual stress is created around the hole 21 to improve fatigue life.

Figure 7:
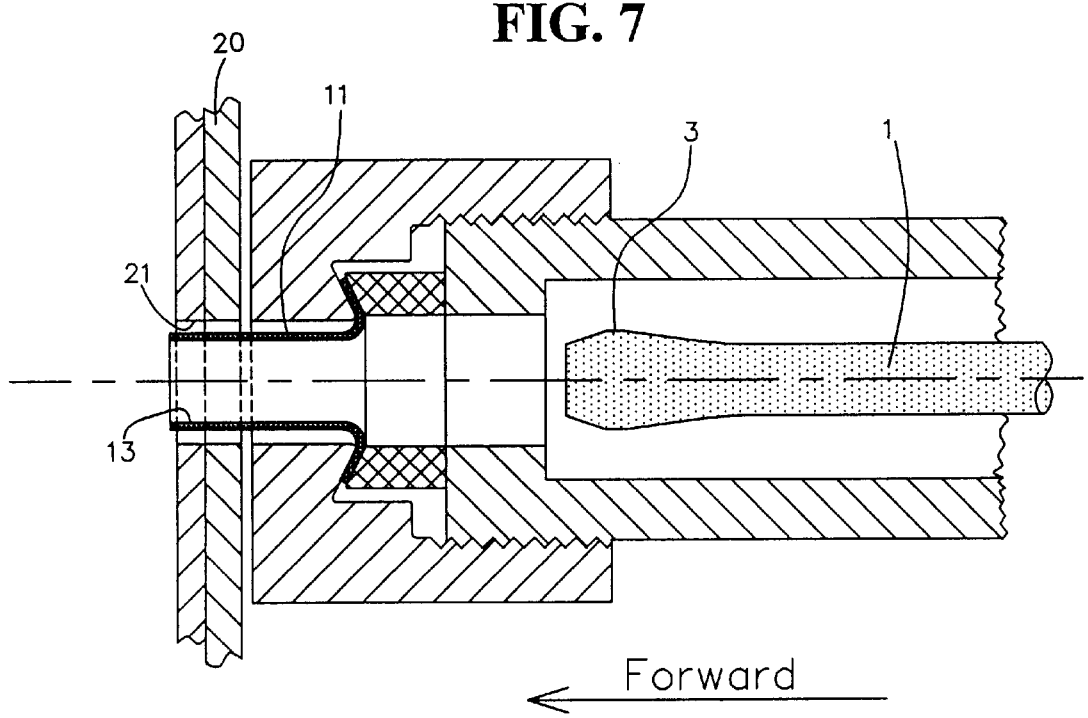
FIG. 7 is a cross sectional view which shows the position of the mandrel after retracting backwardly, the diameter of the hole in an associated workpiece being enlarged, the diameter of the SMA seamless sleeve being restored to its original size and being sufficiently smaller than the diameter of said hole. The change of the diameter of the coldworked hole can be visualized by comparing with FIG. 5.

The final step of coldworking operation is to remove the SMA seamless sleeve 11 together with the mandrel 1 and the mandrel puling means out of the coldworked hole 21 of the associated workpiece. As illustrated in FIG. 7, after the larger diameter portion 3 of said mandrel 1 retracts backwardly through and out of the tubular portion 13 of said sleeve, the diameter of the sleeve restores, because of the superelastic property of shape memory alloys, to its original size which is sufficiently smaller than the diameter of the coldworked hole 21 to ease the removal of said sleeve 1. The change in hole diameter 21 before and after coldworking, relative to the diameter of said sleeve 11, can be visualized by comparing FIG. 5 and FIG. 7. It should be understood that the dimensions are shown exaggerated for explanatory purpose.

The present invention and its attendant advantages will be understood from the foregoing description and it will be apparent that the form, construction, and arrangements of the tubular seamless sleeve made of shape memory alloys and the associated parts of the invention can be varied without changing the concept of the invention, the specific embodiment of the invention described hereinbefore is considered in all respects as illustrative and not restrictive, and furthermore that variation may be made without departing from the scope of the invention as defined in the accompanying claims.

I claim:

1. A method to coldwork holes at ambient temperatures of manufacturing shops, utilizing a superelastic property of shape memory alloys, comprising the steps of:

(a) inserting a tubular seamless sleeve made of shape memory alloys having superelastic property into a hole in a workpiece, whose diameter is sufficiently larger than the outside diameter of said sleeve;

(b) inserting a mandrel having a diameter sufficiently larger than inside diameter of said sleeve, the combined diameter of said mandrel and wall thickness of said sleeve being greater than the diameter of said hole;

(c) pulling said mandrel through said sleeve to expand said sleeve and said hole, thereby coldworking the material around said hole; thereafter said sleeve at ambient temperature restoring immediately to its original diameter before coldworking to ease the removal of said sleeve out of said hole.

2. A method of coldworking holes as claimed in claim 1 which comprises the steps of:

(a) assembling coaxially a prelubricated tubular seamless sleeve of shape memory alloys between a screw-threaded nose cap of hard material and a spacer of hard material, which are carried on a mandrel pulling means;

(b) securing sufficiently firmly the seamless sleeve of shape memory alloy between the nose cap and spacer with force by tightening the screw-threaded nose cap onto the screw-threaded cylinder of a mandrel pulling means;

(c) passing forward a mandrel, which has a smaller diameter portion in its backward end, through the circular passageways in the cylinder of said mandrel pulling means, spacer, and seamless sleeve of shape memory alloys to a location such that the smaller diameter portion of said mandrel is adequately inside of said seamless sleeve;

(d) inserting the mandrel and seamless sleeve of shape memory into the hole of an associated workpiece to be coldworked; and (e) holding the mandrel and seamless sleeve of shape memory alloys in the hole while retracting backwardly said mandrel from the workpiece, thereby expanding the diameter of said seamless sleeve to contact with the hole wall, and thereby compressing the materials of said seamless sleeve and workpiece in a radial direction taken from the center axis of said hole.

3. A method of coldworking holes as claimed in claim 2 wherein the step of assembling coaxially includes:

(a) the use of conical contact surfaces of said nose cap, seamless sleeve, and spacer to provide an automatic coaxial alignment; and (b) the use of fillet radii in the conical surfaces of said nose cap and seamless sleeve to maintain adequately equal space between the central circular passageway of said nose cap and seamless sleeve.

4. A method of coldworking holes as claimed in claim 2 wherein the step of securing firmly includes the use of smooth surfaces of the backward end of said spacer and forward end of said cylinder of said mandrel pulling means to facilitate the tightening of said nose cap onto said cylinder of said mandrel pulling means, and the rough conical contact surfaces of said nose cap and spacer to increase the friction between contact surfaces, thereby preventing the slippage of said seamless sleeve during the passing of said mandrel forwardly and backwardly through said seamless sleeve.

5. A method of coldworking holes as claimed in claim 2 wherein the step of passing forwardly includes the use of conical contact surfaces of said nose cap, seamless sleeve, and spacer, which incline in a direction in favor of preventing the slippage of said seamless sleeve during the sliding of said mandrel forwardly through said seamless sleeve.

6. A method of coldworking holes as claimed in claim 2 wherein the step of passing forwardly includes the steps of expanding the diameter of said prelubricated seamless sleeve, and of positioning the smaller diameter portion of said mandrel adequately inside of said seamless sleeve.

7. A method of coldworking holes as claimed in claim 2 wherein the step of passing forwardly includes the steps of elastically expanding the diameter of said seamless sleeve so that the inside diameter of said seamless sleeve is substantially equal to the diameter of the larger diameter portion of said mandrel, and of restoring the diameter of said seamless sleeve to its original size by means of the superelastic property of said shape memory alloys so that the outside diameter of said seamless sleeve is sufficiently smaller than the diameter of the hole in an associated workpiece.

8. A method of coldworking holes as claimed in claim 2 wherein the step of inserting includes locating said mandrel and seamless sleeve into the holes to be coincident with that portion of said mandrel of smaller diameter surrounded by said seamless sleeve.

9. A method of coldworking holes as claimed in claim 2 wherein the step of retracting backwardly includes the steps of:

(a) retracting backwardly said mandrel through and out of said seamless sleeve;

(b) expanding elastically the outside diameter of said seamless sleeve beyond the diameter of said hole; thereby compressing the material of said hole beyond its yield strength;

(c) restoring the diameters of said seamless sleeve by means of the superelastic property of said shape memory alloys so that the outside diameter of said seamless sleeve is sufficiently smaller than the diameter of said coldworked hole in the associated workpiece; and (d) sliding said seamless sleeve together with said mandrel pulling means out of said coldworked hole in the associated workpiece.

10. The apparatus for coldworking holes in an associated workpiece using tubular seamless sleeves made of shape memory alloys in conjunction with its operation comprising in combination:

(a) a cylindrical-shaped mandrel having an outside larger diameter portion in the forward end and an outside smaller diameter portion;

(b) a seamless sleeve made of shape memory alloys having a tubular portion and a conical shoulder portion which inclines in a direction in favor of preventing slippage while said mandrel sliding forwardly through and out of said seamless sleeve;

(c) said seamless sleeve to be used as a means during coldworking operation for receiving exerted sliding expansion forces from said larger diameter portion of said mandrel while simultaneously adapted to carry said forces in a radial direction to the inside surface of the hole in an associated workpiece for enlarging said hole and putting the material around said hole in compression to improve fatigue properties of said workpiece;

(d) a nose cap having a central circular passageway and a conical rough surface for complementing the conical shoulder of said seamless sleeve to seat and secure, in conjunction with a spacer, said seamless sleeve; and (e) a spacer having a central circular passageway and a conical rough surface for complementing said conical shoulder of said seamless sleeve to secure, in conjunction with said nose cap, said seamless sleeve.

11. The apparatus for coldworking holes in an associated workpiece as claimed in claim 10 wherein a mandrel pulling means is provided in conjunction with said apparatus for firmly securing said seamless sleeve onto said mandrel pulling means and for holding said seamless sleeve into said hole to be coldworked in said workpiece while the larger diameter portion of the mandrel passing through and out of said seamless sleeve and workpiece.

12. The apparatus for coldworking holes in an associated workpiece as claimed in claim 11 wherein one end of the cylinder of said mandrel pulling means is provided with a smooth surface to facilitate, in conjunction with the complementary smooth surface of the backward end of said spacer, screw-thread tightening of said nose cap onto said cylinder of said mandrel pulling means.

13. The apparatus for coldworking holes in an associated workpiece as claimed in claim 10 wherein said seamless sleeve is made of shape memory alloys having the superelastic property to restore the diameter of said seamless sleeve to its original size after the larger diameter portion of said mandrel passing through and out of said seamless sleeve; and is provided with a lubricant type of coating on the inside surface of said tubular portion.

14. The apparatus for coldworking holes in an associated workpiece as claimed in claim 13 wherein said seamless sleeve is made of Nitinol family of shape memory alloys having the superelastic property.

15. The apparatus for coldworking holes in a workpiece as claimed in claim 10 wherein said seamless sleeve is provided with a conical shoulder which inclines in a direction in favor of preventing slippage of said sleeve shoulder while the larger diamater portion of said mandrel passing through and out of said seamless sleeve, and which automatically maintains coaxial position with said spacer and nose cap during screw-thread tightening said nose cap to the cylinder of said mandrel pulling means.

16. The apparatus for coldworking holes in an associated workpiece as claimed in claim 10 wherein said seamless sleeve is provided with a fillet radius at the junction of the tubular portion and conical shoulder portion of said seamless sleeve, therefore furnishing a larger diameter than said tubular portion of said seamless sleeve to ease the entrance of said larger diameter portion of said mandrel, therefore maintaining sufficient space between the outside surface of said seamless sleeve and central circular passageway of said nose cap, thereby allowing the larger diameter portion of said mandrel to pass through and out of said seamless sleeve without interfering with said central circular passageway of said nose cap.

17. The apparatus for coldworking holes in an associated workpiece as claimed in claim 10 wherein said spacer is made of hard material, and is provided with a conical rough contact surface to complement said conical shoulder portion of said seamless sleeve, and to increase the friction, thereby preventing the slippage during the sliding of said mandrel through and out of said seamless sleeve; and is provided with a smooth surface in the backward end to facilitate, in conjunction with the complementary smooth surface in the forward end of the cylinder of said mandrel pulling means, screw-thread tightening of said nose cape onto said cylinder of said mandrel pulling means.

18. The apparatus for coldworking holes in an associated workpiece as claimed in claim 10 wherein said nose cap is made of hard material, and is provided with a conical rough contact surface to seat said conical shoulder of said seamless sleeve, and to increase the friction, thereby preventing the slippage during the sliding of said mandrel through and out of said seamless sleeve.

19. The apparatus for coldworking holes in an associated workpiece as claimed in claim 10 wherein said nose cap is provided with a fillet radius at one end of said central circular passageway for complementing the fillet radius of said conical shoulder of said seamless sleeve, thereby maintaining adequate space between the outside surface of said tubular portion of said seamless sleeve and central circular passageway of said nose cap, and thereby allowing said larger diameter portion of said mandrel to pass through and out of said seamless sleeve without interfering with said central circular passageway of said nose cap.

20. The apparatus for coldworking holes in an associated workpiece as claimed in claim 10 wherein one portion of said nose cap is provided with internal screw-thread for assembling to the cylinder of said mandrel pulling means, and for applying an axial force by turning, and thereby tightening the screw-thread to firmly secure said seamless sleeve between said conical surfaces of said nose cap and spacer.

* * * * *